(12) United States Patent
Plummer

(10) Patent No.: US 6,776,331 B2
(45) Date of Patent: Aug. 17, 2004

(54) ELECTRONIC KEY AND READER APPARATUS FOR A LOCK

(75) Inventor: Michael J. Plummer, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/202,281

(22) Filed: Jul. 24, 2002

(65) Prior Publication Data

US 2003/0024977 A1 Feb. 6, 2003

(30) Foreign Application Priority Data

Aug. 3, 2001 (GB) .............................................. 0118973

(51) Int. Cl.⁷ .............................................. G06F 17/00
(52) U.S. Cl. .................... 235/375; 235/382; 235/382.5; 235/439; 235/462.01; 235/492
(58) Field of Search ................................ 235/375, 492, 235/462.01, 382, 439, 382.5

(56) References Cited

U.S. PATENT DOCUMENTS

| | | | | |
|---|---|---|---|---|
| 4,820,910 A | * | 4/1989 | Higo et al. ................. | 235/439 |
| 5,298,725 A | * | 3/1994 | Fischer ....................... | 235/382 |
| 6,047,575 A | * | 4/2000 | Larson et al. .............. | 70/278.1 |
| 6,213,391 B1 | | 4/2001 | Lewis ......................... | 235/380 |
| 2002/0023027 A1 | * | 2/2002 | Simonds ..................... | 705/26 |
| 2003/0047613 A1 | * | 3/2003 | Funamoto ............. | 235/462.01 |
| 2004/0030601 A1 | * | 2/2004 | Pond et al. .................. | 705/16 |

FOREIGN PATENT DOCUMENTS

| | | | | |
|---|---|---|---|---|
| EP | 0385290 A1 | | 5/1990 | ............. G07F/7/10 |
| GB | 2356426 A | * | 5/2001 | ........... E05B/49/00 |

* cited by examiner

*Primary Examiner*—Michael G. Lee
*Assistant Examiner*—Seung Lee

(57) ABSTRACT

An electronic key and reader apparatus for a lock include a key (400) incorporating a display (402) on which is rendered an image representing a keycode (410), the keycode being adapted in relation to the operation of the key. A reader incorporated in the reader apparatus scans the keycode using a sensor array (408) and may interact with the key by exchanging message data (406) using communication port (404).

24 Claims, 5 Drawing Sheets

ELECTRONIC KEY AND READER APPARATUS FOR A LOCK

BACKGROUND OF THE INVENTION

1. Field of the Invention

The present invention relates to a method for operating a lock comprising an electronic key and a corresponding reader, and also, to an apparatus employing such a method.

2. Description of the Related Art

Securing items and premises by means of locks operated by keys is standard practice. However, a common security threat is that the system is compromised by losing or copying the key. Such a threat applies equally to traditional mechanical keys as well as to more sophisticated systems employing codes, for example, computer passwords, i.e., should the key or password be copied (or stolen), then the security of the system is compromised. For mechanical locks, this can be costly, e.g., necessitating changing the lock in order to restore security. Recovery can be further exacerbated if the key/password is a 'master' capable of higher level access.

Concerning electronic keys, to counter the threat of copying, the key may be partitioned into two parts: one associated with the user, the other with a physical key carrier, for example, a user PIN code and associated ATM bankcard. Loss of either (but not both) does not compromise the security of the system. One problem of such 2-part keys lies in the user part: the PIN may be forgotten, so the PIN has to be short to be capable of being memorized—this means it has a limited number of combinations, possibly allowing a 'head-on' attack where all combinations can be tried in order to gain access. Where the user is allowed to select a code or password, forgetful (or lazy) users may select easy to remember codes—for example, a PIN code '1111', or a password set to be the name of the user's pet; such codes are inherently insecure.

A further limitation with the keys and codes described above is that they are static. Codes which change are more secure since a lost or stolen code then only has a limited lifetime. A disadvantage is that the code change must be coordinated with the key reader which operates the lock. A further problem is that a code which changes must have many combinations to be sufficiently secure; this implies the use of long codes—this, in turn, may delay system operation for a legitimate user by slowing down the transfer of the keycode to the reader, for example, where the keycode is transferred to the reader by means of a serial communications protocol.

A further problem is that security is weakened where the keycode is accessible to an unauthorized user when being transferred between the key and the reader: for example, eavesdropping the communication of the keycode between the key and the reader that can occur with radio transmitter keys.

In addition, it is useful for system administration purposes that a user may inspect a key to ascertain if it is functioning and perhaps to report status information indicated thereon.

SUMMARY OF THE INVENTION

It is, accordingly, an object of the present invention to overcome these and other problems by use of an improved apparatus comprising an electronic key and reader.

In accordance with the present invention, there is provided an apparatus for a lock comprising:

a key comprising a first data processor and a display, the first data processor operable to generate a keycode wherein the keycode is adapted in relation to the operation of the key, to convert the keycode to an image representing the keycode, and to render the image on the display, the display being arranged so that the image is visible on a surface of the key; and a reader comprising a second data processor, a store and an optical scanner, the optical scanner operable to scan the image visible on the key and to produce scan data, the second data processor operable to receive the scan data, to convert the scan data to a scanned keycode, to compare the scanned keycode with a plurality of keycodes held in the store and to control a lock mechanism in accordance with the result of the comparison.

The key and reader apparatus may be intended to act as an access controller for a lock. As such, the key reader may be situated remotely from the lock with which it is associated. Alternatively, the reader may be integrated into the lock itself or even a product, for example, the reader may be built into a personal computer in which the reader outputs a signal to control the operation of the personal computer in accordance with a keycode comparison. The key function may be integrated within a host product or may be a dedicated unit. The reader may interact with the key for configuration and/or identification purposes. The reader may be enabled by a user authentication procedure. The reader may incorporate a cavity to physically accommodate the unit containing the key thereby facilitating interaction with the key; access to the cavity may be physically controlled by a user authentication procedure.

Also, in accordance with the present invention, there is provided a method for operating a lock wherein a key is read by a reader, the method being supported by a keycode being adapted in relation to the operation of the key, the keycode is converted to an image representing the keycode, the image is arranged to be visible on a surface of the key, wherein the reader optically scans the image to produce scan data, the scan data is converted to a scanned keycode, the scanned keycode is compared with a plurality of keycodes and a lock mechanism is controlled in accordance with the result of the comparison.

The key may display information relevant to the usage of the key, for example, context information. The display may be a liquid crystal display (LCD). A portion of the display may include a keycode, that is, a code which represents an access code for the lock. The keycode may be represented in a variety of formats displayable on the key, both human and/or machine readable.

Alternatively, display of the keycode may be suppressed until such time as the key is scanned by the reader. The keycode may adapt during the period of usage of the key; such adaptation may be invoked due to interaction with the reader and/or the passage of time.

BRIEF DESCRIPTION OF THE DRAWINGS

Further features and advantages will now be described, by way of example only, with reference to the accompanying drawings, in which.

DESCRIPTION OF THE PREFERRED EMBODIMENTS

Within the following description of the present invention, the term 'key' refers to an entity which incorporates the features and functions of a key, for example, a dedicated key unit or a host product incorporating a key. The term 'keycode' refers to a code which represents an access code for the lock to which the keycode relates; the code may be a single code or a set of codes and is derived from one or more numerical values. The term 'scanned keycode' refers to a code which is computed by the reader from data output by the optical scanner. The term 'differs' refers to the number of different keycodes within the total set of keycodes; differs is analogous to the term 'combinations' used for conventional mechanical keys. The term 'reader' refers to apparatus which scans and interacts with keys. The term 'CCD' refers to the charged-coupled device used to scan an image displayed on a surface of a key. The term 'pixel' refers to the smallest distinct displayable element of a display.

Figure 1:
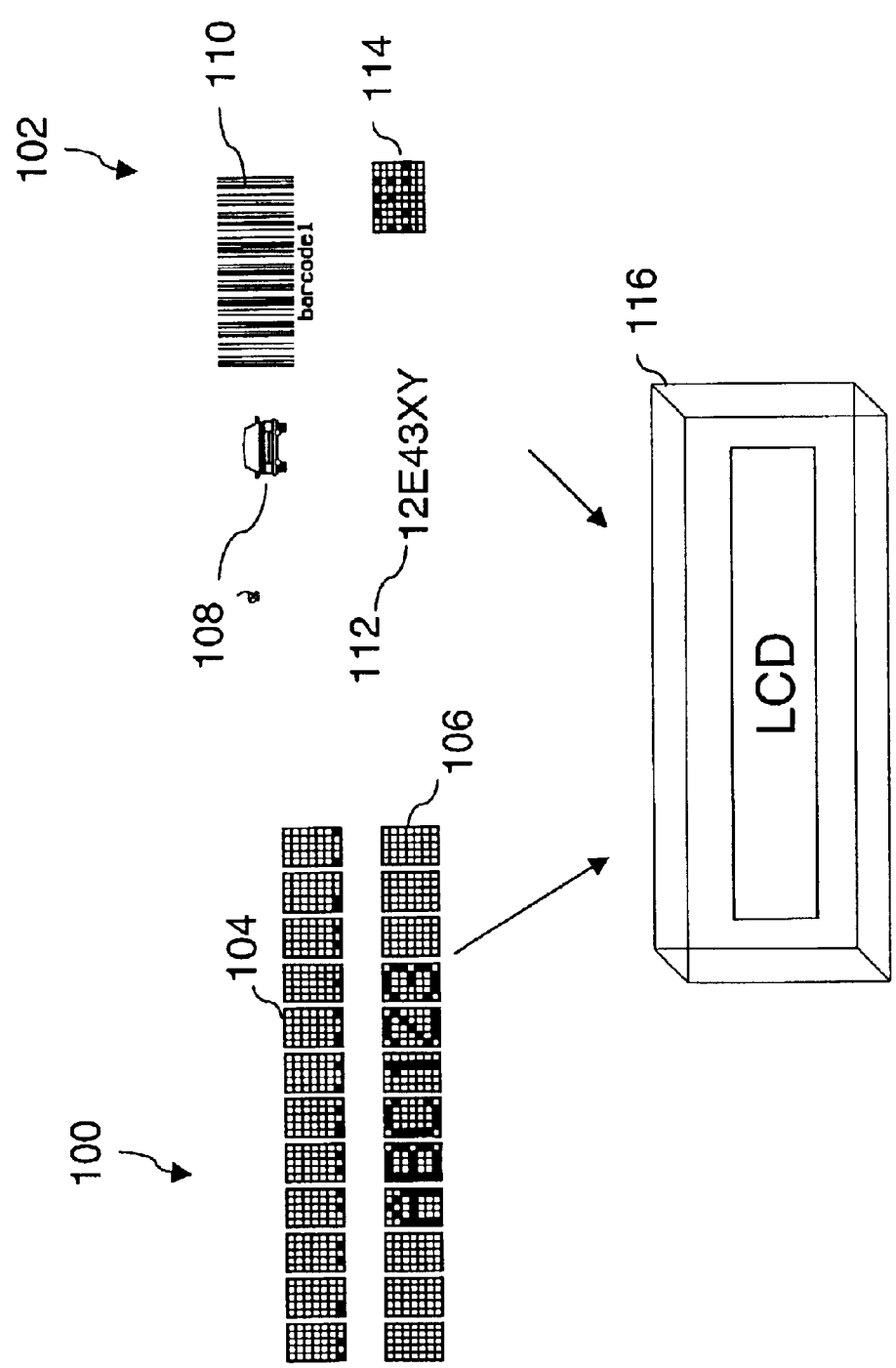
FIG. 1 shows the representation of keycodes on a LCD.

FIG. 1 shows examples of representations of keycodes using two common LCD styles: a character-based LCD, shown generally at 100, and a pixel-based LCD shown generally at 102. As shown, LCD 100 may render a keycode as a machine readable array of pixels 104 and/or a human readable code 106. The machine readable pixel format arrangement is arbitrary and may be selected for appropriate performance and cost with respect to a specific application, for example, the number of pixels is generally proportionate to the number of keycode differs. The linear pixel keycode array 104 allows a cost saving in the reader in that a simple sensing means is utilizable, for example, a linear one-dimensional CCD array. An advantage of a combined human readable and machine readable keycode is that the human readable part could represent a checksum for a more complex code rendered by the machine readable keycode. This allows a user to verify the keycode with a system administrator in case of operational difficulty, without disclosing the actual keycode. The CCD array uses parallel sensing which allows rapid reading of complex keycodes, with the advantage that fast speed of operation is maintained.

All the previous description applies equally to the pixel-based LCD 102 where there is, in addition, the flexibility to represent keycodes as icons 108, barcodes 110, 2-dimensional pixel arrays 114 as well as alphanumerics 112. In general, a keycode comprises any combination of graphic, text, numeric, barcode, icons and pixel-based pattern. Pixel-based LCDs can offer improved resolution compared to character-based LCDs—at extra cost for the LCD and perhaps also the scanning means in the reader. A derivative of the pixel-based LCD is the custom-made LCD which can be optimized for a particular application and is a viable option where production volumes are sufficient.

Whichever display option is selected—character, pixel or custom—an appropriate LCD must be available in the unit incorporating the key function 116.

The invention offers the ability for the keycode to be adapted (or changed) from a first code to a second code in accordance with a pre-defined sequence, the sequence being derived from any combination of number sequence generator and code table. A preferred number sequence generator is a pseudo-random number sequence generator. Adaptation of the keycode from the first code to the second code is in response to any combination of a periodic timed event and an operational event. An example of an operational event is where the key is instructed by the reader.

Figure 2:
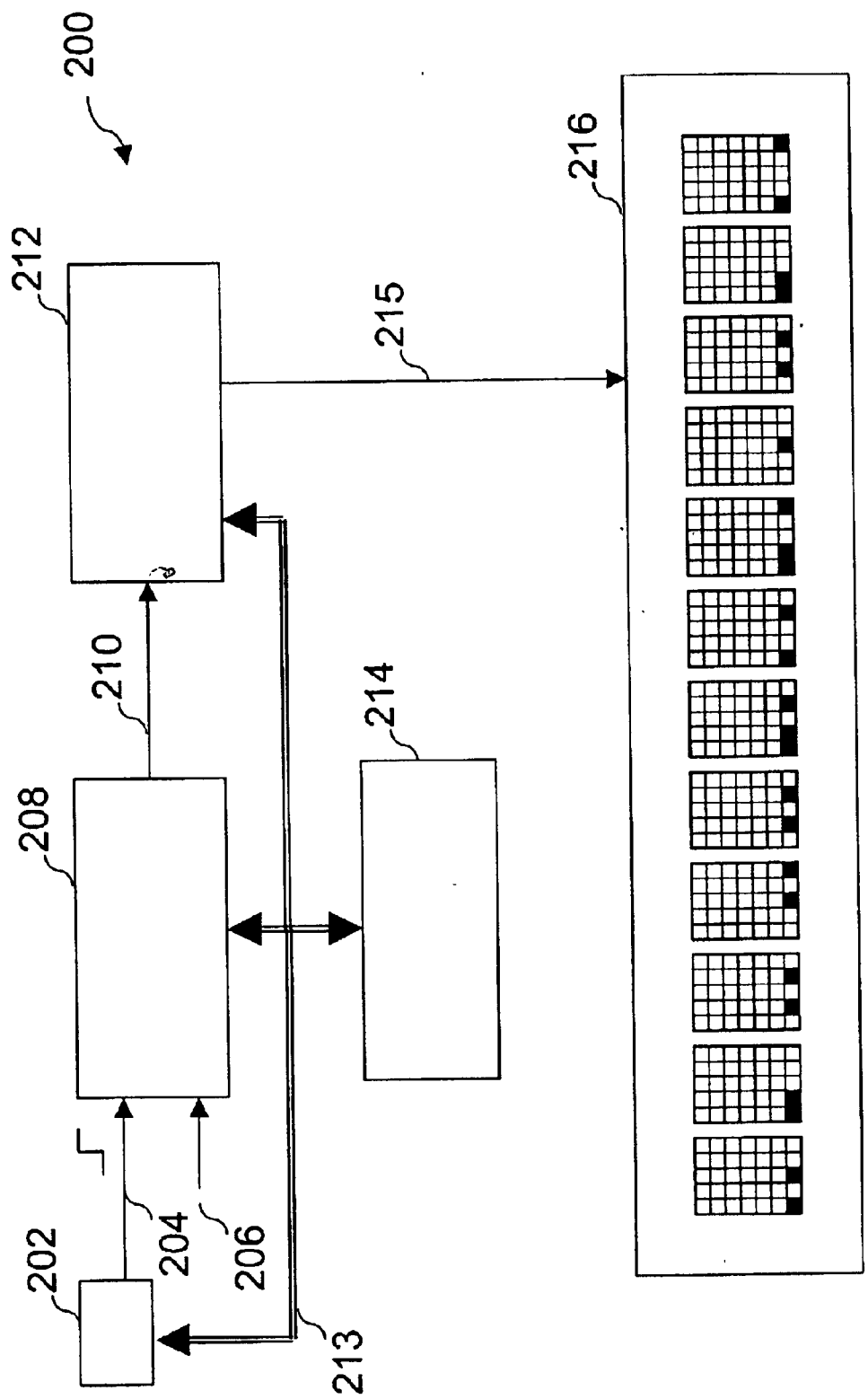
FIG. 2 shows the generation and conversion of keycodes in the key.

FIG. 2 shows the generation and conversion of keycodes in the key. The figure depicts a data processing unit 200 and a LCD 216. The data processor comprises a CPU 214 and an oscillator 202 which generates periodic events or clock ticks 204 to trigger the pseudo-random number sequence generator 208 to generate the next (keycode) number 210 in the sequence. For machine readable keycodes, the period of the clock ticks may be set to a rate comparable with the maximum display rate of the LCD and the scanning capability of the reader. Rates up to several Hertz are achievable using standard LCDs and CCD arrays. This offers an alternative definition of a keycode: as well as one pre-determined static number value over a time interval, a keycode may alternatively be represented by a pre-determined sequence of number values over a time interval. The duration of the time interval must be kept sufficiently short to allow rapid operation; using a rate of several Hertz satisfies this condition. In addition, or as an alternative, the generator may be triggered, at input 206, in response to an interaction with a key reader. A keycode may include a unique code identifying the key.

The keycode 210, represented as discussed above, is presented to a converter 212 which converts the numerical value into image data 215 corresponding to the format and capability of the LCD 216 of the key. The CPU 214, oscillator 202, generator 208 and converter 212 are connected via bus 213.

Figure 3:
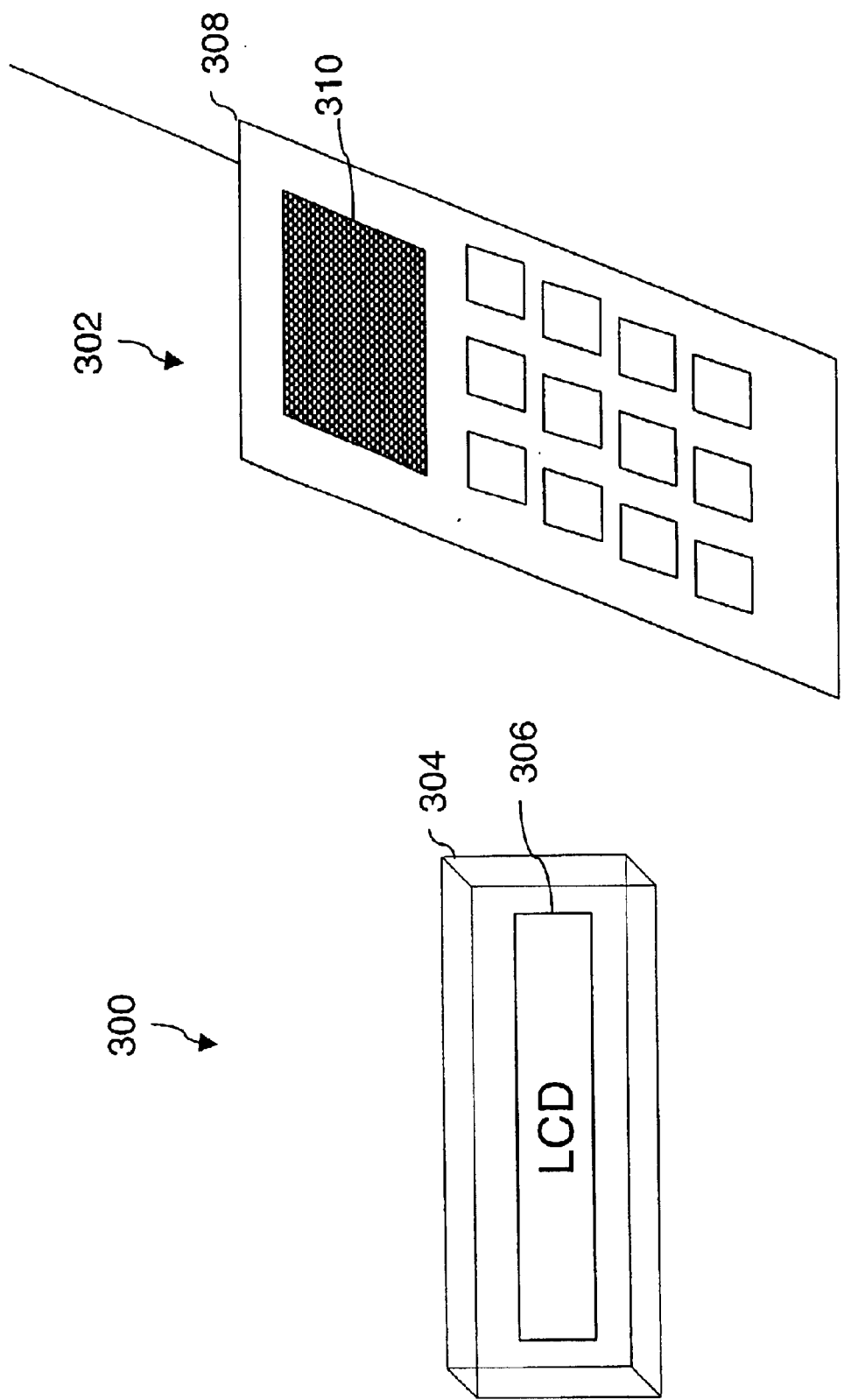
FIG. 3 shows examples of products incorporating the key.

FIG. 3 shows examples of products incorporating the key. A dedicated key product 300 comprises an enclosure 304 with a LCD 306 visible through a window in the enclosure. The key can also render user interface information on the LCD, the information comprising any combination of directions for use, access rights and a human readable portion of the keycode. A host product 302 is also shown in the form of a mobile phone comprising housing 308 and LCD 310 visible through a window in the housing. Clearly, the key may comprise a function of a host product, such as, a mobile phone, PDA, wristwatch, pager or game machine.

Figure 4:
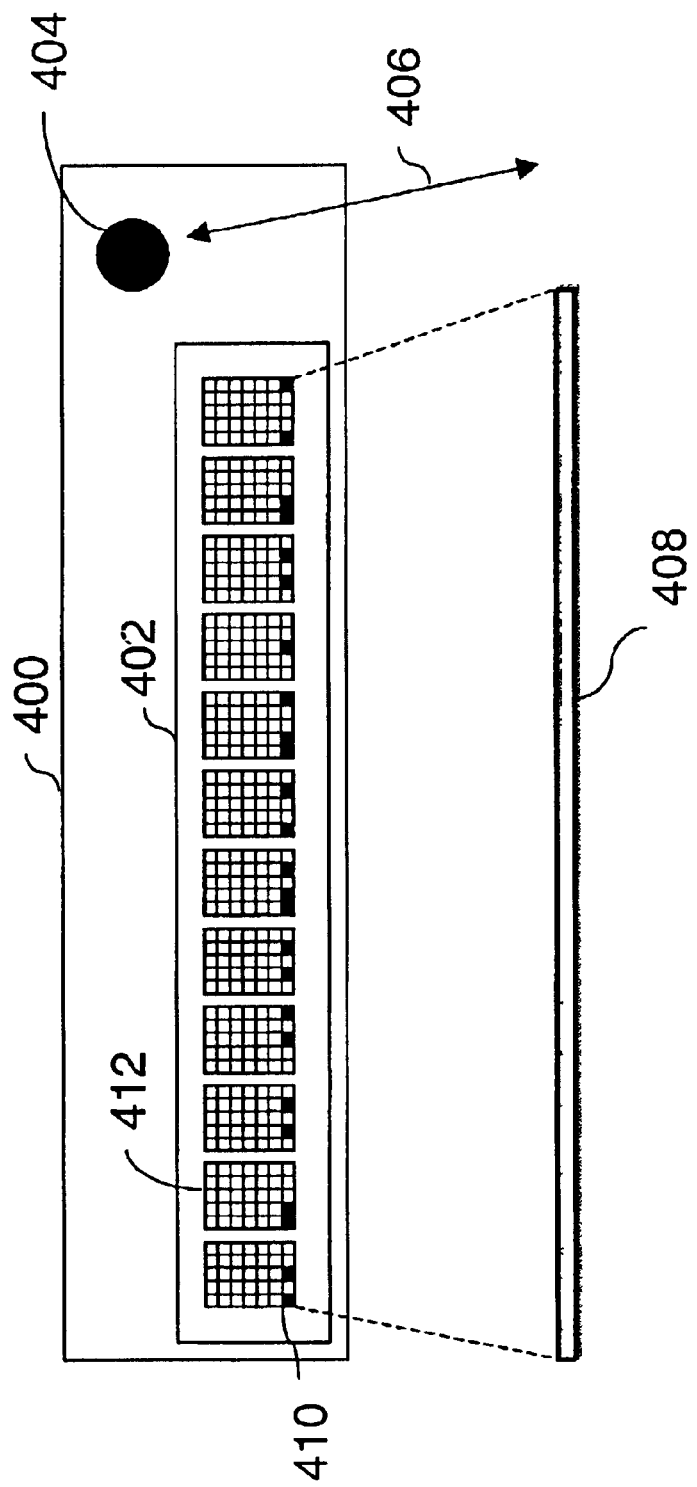
FIG. 4 shows keycode scanning by a reader.

FIG. 4 shows keycode scanning by a reader. A key 400 comprises a LCD 402 on which is displayed an image of a keycode 410. The LCD is character-based comprising a row of character blocks 412, each block comprising a rectangular pixel matrix, for example, 7 rows by 5 columns. In the example of FIG. 4, the keycode image 410 is formatted using the bottom pixel row of each of the twelve character blocks 412; that is, the keycode is represented by a row of 60 pixels (bits)—12 characters×5 columns. This format is convenient since the LCD can be optically scanned using a charged-coupled device (CCD) array in the reader—in this case, a low cost 1-dimensional CCD 408. Further, to provide easier alignment of the key (LCD) in relation to the optical scanner in the reader, the example above could identically duplicate the keycode using several rows of the characters thus allowing the scanner to scan any of the rows; the keycode would then resemble a barcode style of representation. Clearly, a suitable LCD could also render the keycode using standardized barcodes, as discussed earlier. Keycodes rendered using complex icons, text, graphics or pixel patterns may require higher resolution or even custom LCDs co-operating with more sophisticated optical scanners in the reader. Two-dimensional CCD arrays, as used in modern video cameras, are relatively low cost and may be attractive for applications using such complex keycode images as, like any CCD array, they are capable of fast parallel reading of such codes.

In some applications, the reader is able to exchange message data with the key using a communications link, the message data comprising any combination of configuration data and identification data. The communications link may be uni-directional or bi-directional, and may be implemented using any convenient method from those available in the art, both wired and wireless. For robustness and to protect against eavesdropping, a preferred communications link is one which utilizes infrared radiation and supports a serial protocol.

In the example of FIG. 4, the key 400 includes an infrared communications port 404 for communicating message data 406 with the reader. An example of configuration data exchanged between the key and reader using the communications link is where the key renders the keycode as an image on the LCD in response to message data exchanged with the reader. In this way, the keycode (or a part thereof) could be concealed (that is, not displayed on the LCD of the key) until the moment when the reader actually scans the LCD. Such a feature enhances the security of the system and also allows application flexibility to render on the LCD information relevant to a user at one time, and information relevant to the reader at another time. A typical example where this might be useful is the barcode format described above where a large part of the LCD may be required to render the keycode (barcode). Other configuration data exchanged between the key and reader using the communications link include, but are not limited to, data to initialize the sequence generator in the key, reset data, uploading of code tables and date/time information. Identification data exchanged between the key and reader using the communications link include, but are not limited to, data relevant to users and locks including access rights, user IDs and usage history data. The communications link may also be used for other messaging, for example, data relevant to applications in a host product incorporating the key.

Figure 5:
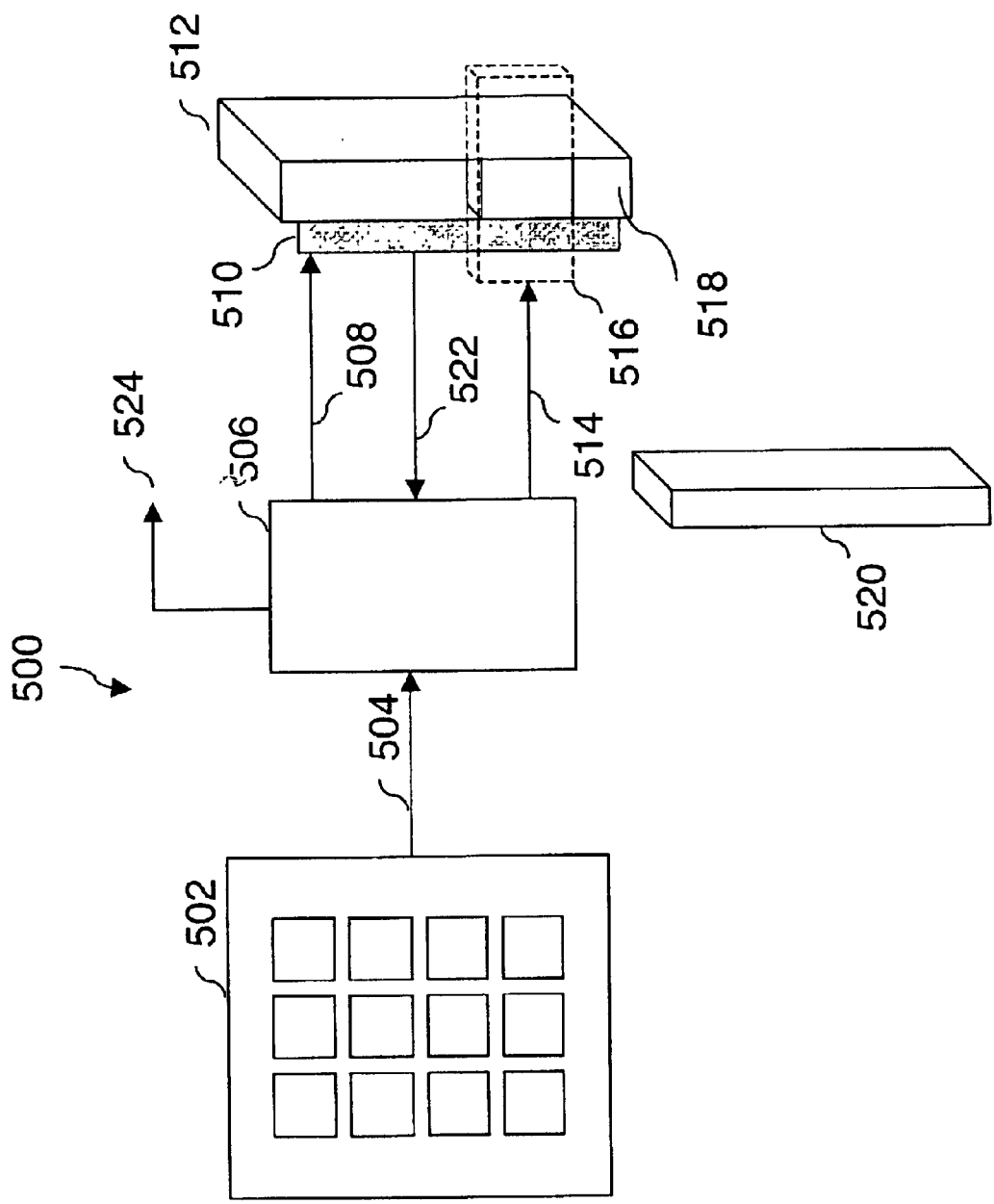
FIG. 5 shows control of a reader by a user authentication procedure.

FIG. 5 shows control of a reader by a user authentication procedure. A reader can be enabled in response to a valid user authentication transaction, the user authentication transaction comprising the validation of any combination of mechanical key, PIN code, fingerprint scan, facial scan and retinal scan. The example in FIG. 5 shows a reader 500 comprising a cavity 512 to receive a key 520, the cavity comprising an aperture 518 through which the key is inserted into the cavity. The reader 500 also comprises a mechanical shutter 516 operable in response to a failed user authentication transaction to, in any combination, prevent the insertion of the key into the cavity, secure the key within the cavity and prevent removal of the key from the cavity.

In the example of FIG. 5, a starting state is presumed whereby a user wishes to insert a key 520 into the reader 500 comprising a cavity 512 which is barred by shutter 516. Using keypad 502 a user enters a user PIN code 504. Clearly, the user keypad could be substituted by an alternative mechanism including, but not limited to, a mechanical key, fingerprint scanner, facial scanner or retinal scanner. The PIN code is sent to data processing unit 506 which checks if the code is valid. If this is the case, the data processing unit 506 issues a shutter control signal 514 to open shutter 516 thus allowing the user to insert the key 520 into the cavity 512 through aperture 518. The data processing unit detects the key has been inserted (not shown) and re-closes the shutter thereby securing the key 520 within the cavity 512 of the reader. The data processing unit 506 then issues a signal 508 to the CCD scanner 510 to enable the LCD of the key to be scanned; the scanned keycode 522 is returned to the data processing unit. If the keycode is valid, then the data processing unit 506 will issue a "valid key" message at output 524 (which is then used to open or close the lock, not shown in FIG. 5) and, at an appropriate time, will issue a shutter control signal 514 to open shutter 516 thus allowing the user to remove the key 520. Conversely, should the keycode be invalid, then the data processing unit 506 will issue a "non-valid key" message at output 524 and retain the key 520 by maintaining the shutter 518 in the closed position.

The foregoing description of a reader mechanism is presented by way of example only and represents one of a range of implementations that can readily be defined by a person skilled in the art to exploit the advantages of the method as disclosed in the present invention.

In the description above and with reference to FIG. 4, an electronic key and reader apparatus for a lock are described comprising a key 400 incorporating a display 402 on which is rendered an image representing a keycode 410, the keycode being adapted in relation to the operation of the key. A reader scans the keycode using a sensor array 408 and may interact with the key by exchanging message data 406 using communication port 404.

What is claimed is:

1. An apparatus for a lock comprising:
   a key comprising a first data processor and a display, the first data processor generating a keycode, the keycode being adapted in relation to operation of the key, converting the keycode to an image representing the keycode, and rendering the image on the display, the display being arranged so that the image is visible on a surface of the key; and
   a reader comprising a second data processor, a store and an optical scanner, the optical scanner scanning the image visible on the key and producing scan data, and the second data processor receiving the scan data, converting the scan data to a scanned keycode, comparing the scanned keycode with a plurality of keycodes stored in the store, and controlling a lock mechanism in accordance with a result of the comparison.

2. The apparatus as claimed in claim 1, wherein the display is a liquid crystal display.

3. The apparatus as claimed in claim 2, wherein the key is configured as a mobile phone.

4. The apparatus as claimed in claim 2, wherein the key is configured as a wristwatch.

5. The apparatus as claimed in claim 2, wherein the optical scanner is a CCD array.

6. The apparatus as claimed in claim 1, wherein the image representing the keycode comprises a pixel-based pattern.

7. The apparatus as claimed in claim 1, wherein the first data processor comprises a pseudo-random number generator for generating the keycode.

8. The apparatus as claimed In claim 7, wherein the first data processor comprises an oscillator for triggering the pseudo-random number generator so as to adapt the keycode.

9. The apparatus as claimed in claim 1, wherein the key is operable to render user interface information on the display.

10. The apparatus as claimed in claim 1, wherein the key is configured as a mobile phone.

11. The apparatus as claimed in claim 1, wherein the key is configured as a wristwatch.

12. The apparatus as claimed in claim 1, wherein the reader exchanges message data with the key using a communications link.

13. The apparatus as claimed in claim 12, wherein the communications link utilizes infrared radiation and supports a serial protocol.

14. The apparatus as claimed in claim 12, wherein the first data processor renders the keycode as an image on the display in response to message data exchanged with the reader.

15. The apparatus as claimed in claim 1, wherein the optical scanner is a CCD array.

16. The apparatus as claimed in claim 1, wherein the reader is operable in response to a valid user authentication transaction.

17. The apparatus as claimed in claim 1, wherein the reader comprises a cavity for receiving a key, the cavity having an aperture through which the key is inserted into the cavity.

18. The apparatus as claimed in claim 17, wherein the reader further comprises a mechanical shutter operable in response to a valid user authentication transaction thereby allowing the insertion of the key into the cavity.

19. The apparatus as claimed in claim 1, wherein the reader is built into a personal computer and outputs a signal enabling operation of the personal computer in accordance with the result of the comparison.

20. A method for operating a lock wherein a key is read by a reader, the method comprising the steps:

generating a keycode in the key, the keycode being adapted in relation to the operation of the key;

converting the keycode to an image representing the keycode;

displaying the image on a surface of the key;

optically scanning, in the reader, the image on the surface of the key to produce scan data;

converting the scan data to a scanned keycode comparing the scanned keycode with a plurality of stored keycodes; and controlling a lock mechanism in accordance with the result of the comparison.

21. The method as claimed in claim 20, wherein, in said generating step, the keycode is adapted from a first code to a second code in accordance with a pre-defined sequence.

22. The method as claimed in claim 21, wherein the adapting of the keycode from the first code to the second code is in response to a periodic timed event.

23. The method as claimed in claim 21, wherein the adapting of the keycode from the first code to the second code is in response to an exchange of data with the reader.

24. The method as claimed in claim 20, wherein the keycode comprises a unique code identifying the key.

* * * * *